(12) United States Patent
Nay

(10) Patent No.: US 9,098,278 B1
(45) Date of Patent: Aug. 4, 2015

(54) BATTERY STATE DETECTION BY USE OF VOLTAGE IN A SHARED POWER SYSTEM BACKGROUND

(71) Applicant: Google Inc., Mountain View, CA (US)

(72) Inventor: Shane R. Nay, San Jose, CA (US)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 13/798,415

(22) Filed: Mar. 13, 2013

Related U.S. Application Data

(60) Provisional application No. 61/713,866, filed on Oct. 15, 2012.

(51) Int. Cl.
*G06F 1/30* (2006.01)
*G06F 1/32* (2006.01)

(52) U.S. Cl.
CPC ............. *G06F 1/3206* (2013.01); *G06F 1/30* (2013.01); *G06F 1/3212* (2013.01)

(58) Field of Classification Search
CPC ........ G06F 1/30; G06F 1/3212; G06F 1/3234
See application file for complete search history.

(56) References Cited

U.S. PATENT DOCUMENTS

| 7,560,831 | B2 | 7/2009 | Whitted et al. | |
|---|---|---|---|---|
| 7,991,588 | B1 | 8/2011 | Krieger | |
| 2006/0212636 | A1* | 9/2006 | Yasuo | 710/303 |
| 2010/0299548 | A1* | 11/2010 | Chadirchi et al. | 713/340 |

* cited by examiner

*Primary Examiner* — Albert Wang
(74) *Attorney, Agent, or Firm* — Lerner, David, Littenberg, Krumholz & Mentlik, LLP

(57) ABSTRACT

A method and apparatus is provided wherein a server is powered by a battery connected to a charging circuit. The voltage output by the battery is monitored and when it falls below a threshold, a determination is made that the battery is being depleted. In response to the determination, the server is brought into a reduced power consumption state or a data saving state.

23 Claims, 10 Drawing Sheets

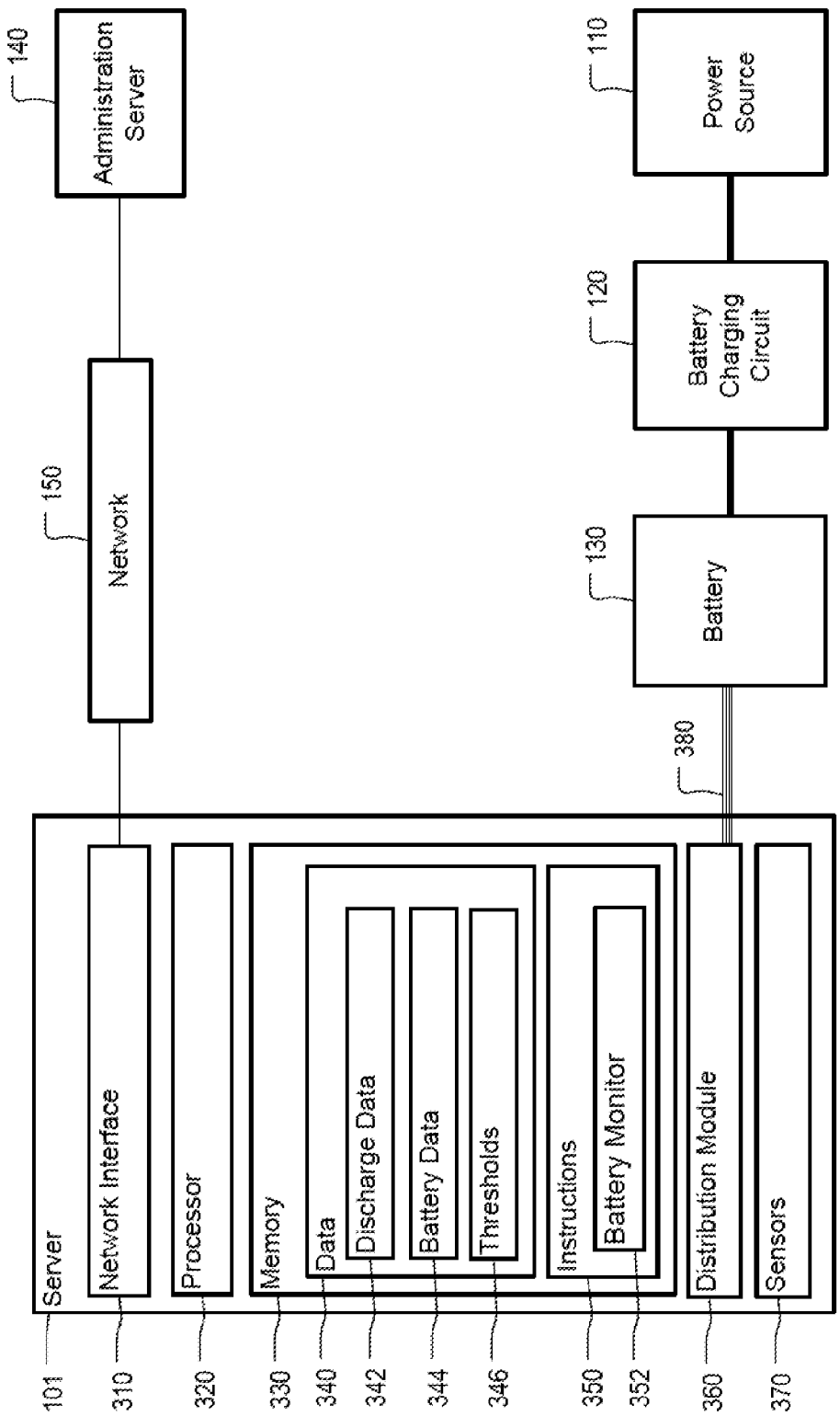

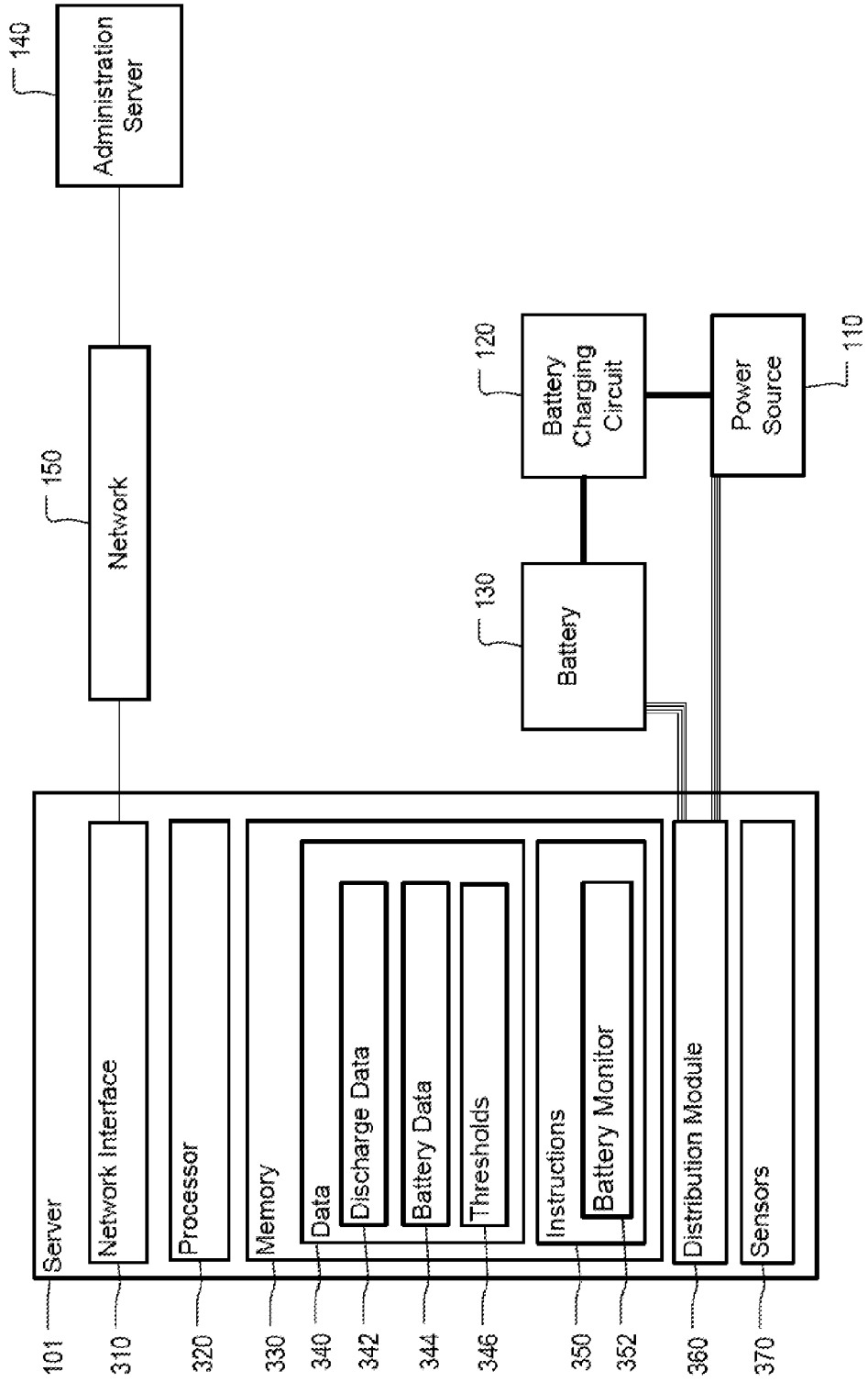

BATTERY STATE DETECTION BY USE OF VOLTAGE IN A SHARED POWER SYSTEM

BACKGROUND

CROSS-REFERENCE TO RELATED APPLICATIONS

The present application claims the benefit of the filing date of U.S. Provisional Patent Application No. 61/713,866 filed Oct. 15, 2012, the disclosure of which is hereby incorporated herein by reference.

Uninterruptable power supplies (UPS) are devices that provide emergency power backup to computers. They often include a battery and a circuit for charging the battery. When power is lost, UPS devices use their batteries to power computers connected to them. Due to many batteries' limited capacity, when computers begin drawing battery power, immediate action may be needed by the computers to save their data before the batteries run out and data is lost.

UPS devices may use data interfaces, such as USB or serial, to connect to their computers. Data cables connecting the UPS devices and the computers may be used to transmit signals alerting the computers that they are running on battery power. By using an extra cable (in addition to a power cord), UPS devices may notify their respective computers that a power outage is taking place and the computers should save their data and prepare to shut down.

However, the use of the data cables may increase the maintenance costs of data centers. The cables may need to be connected manually and, afterwards, troubleshot when they become loose or damaged. In data centers consisting of thousands of computers, the extra cables may become another potential point of failure, and their use may contribute to the cost of data center maintenance. Therefore, despite its utility, using separate data cables to connect UPS devices to their computers may also come at a cost.

SUMMARY

In one aspect, a data center is provided that includes a server, an external power supply source coupled to the server, a battery, and a battery charger coupled to the battery and the external power source. The battery charger is configured to charge the battery. The server is configured to monitor a voltage output by the battery using one or more voltage sensors and detect, based on the voltage, that the server is running on battery power. The server is further configured to transition from a first state to a second state in which the server consumes a reduced amount of power while still continuing to operate in response to detecting that the battery charger is no longer re-charging the battery while the server is drawing power from the battery.

The server may further be configured to detect that the battery charger is no longer re-charging the battery while the server is drawing power from the battery. The battery may be part of an uninterruptable power supply (UPS) device and the server may lack a data connection to the UPS device. The battery may further be used to power the server while being simultaneously charged by the power charger. The server may further be part of a server rack in the data center. The battery and battery charger may further be part of a battery backup system used by the server rack. The server may further be configured to store in a memory, an indication of one or more of half-reaction used by the battery to store power, number of cells in the battery, and voltage output by the battery when the battery is fully charged. The server may further be configured to calculate a threshold based on the indication that is stored in the memory. The detection that the battery charger is no longer re-charging the battery while the server is drawing power from the battery is based on the voltage crossing the threshold.

The server may further be configured to store in a memory an indication of a rate at which the server draws power from the battery and calculate a threshold based on the rate at which the server draws power from the battery. The detection that the battery charger is no longer re-charging the battery while the server is drawing power from the battery may be based on the voltage crossing the threshold. The control terminal may further configured to store in a memory, an indication of duration of a period for which the battery has been in use and calculate a threshold based on the duration of the period for which the battery has been in use. The detection that the battery charger is no longer re-charging the battery as the server is drawing power from the battery may be based on the voltage crossing the threshold.

In another aspect, a data center is provided that includes a control terminal, an external power source, a battery charger coupled to the external power source, a battery coupled to the battery charger, and a first server coupled to the battery. The battery charger is configured to re-charge the battery while the battery is supplying power to one or more servers in the data center. The first server being powered by a signal that is output by the battery, and the first server being configured to transmit an indication of a characteristic of the signal to the control terminal. The control terminal is configured to receive the indication of the characteristic that is transmitted by the first server and detect, based on the characteristic crossing a threshold, that the battery charger is no longer re-charging the battery as the server is drawing power from the battery. The characteristic, in some instances, may be voltage.

The control terminal may further be configured to transmit to the first server a message instructing the first server to transition from a first state into a second state. The message may be transmitted by the control terminal in response to detecting that the battery charger is no longer re-charging the battery as the first server is drawing power from it. The data center may further include a second server and the control terminal may further be configured to transmit to the second server a message instructing the second server to transition from a first state to a second state. The message may be transmitted by the control terminal in response to detecting that the battery charger is no longer re-charging the battery while the first server is drawing power from the battery.

The control terminal may further be configured to reduce a rate at which service requests received at the data center are routed to the first server. The rate is reduced by the control terminal in response to detecting that the battery charger is no longer re-charging the battery while the first server is drawing power from the battery. The control terminal may be further configured to store in a memory, an indication of one or more of half-reaction used by the battery to store power, number of cells in the battery, voltage output by the battery when the battery is fully charged, and calculate the threshold based on the indication that is stored in the memory.

The control terminal may be further configured to store in a memory an indication of a rate at which the first server draws power from the battery and calculate the threshold based on the rate at which the first server draws power from the battery. The control terminal may be further configured to store in a memory, an indication of duration of a period for which the battery has been in use and calculate the threshold based on the duration of the period for which the battery has been in use.

In yet another aspect, a method is provided for supplying battery backup to servers in a data center. The method includes connecting a battery charger to an external power source, connecting the battery charger to a battery, using a signal that is output by the battery to power a server in the data center. The method further includes re-charging the battery by the battery charger while the server is drawing power from the battery, monitoring voltage output by the battery using one or more voltage sensors that are part of the server, and transmitting, from the server to a terminal, an indication of the voltage output by the battery. The method further includes receiving from the terminal a message instructing the server to transition from a first state to a second state when the voltage output by the battery output by the battery crosses a threshold. In some instances, the terminal may be in charge of monitoring power backup systems in the data center.

The signal may further be a direct current (DC) signal. The battery may further be located on the only electric path between the external power source and the server. The external power source is the only source of power used by the server. Transitioning from the first state to the second state may further cause the server to reduce the amount of power needed by the server to operate. The method may further include storing in a memory of the terminal, an indication of one or more of half-reaction used by the battery to store power, number of cells in the battery, and voltage output by the battery when the battery is fully charged. The method may further include calculating, by the terminal, the threshold based on the indication that is stored in the memory. Alternatively, the method may further include storing in a memory of the terminal, an indication of a rate at which the server draws power from the battery and calculating, by the terminal, the threshold based on the rate at which the server draws power from the battery. As yet another alternative, the method may further include storing in a memory of the terminal, an indication of duration of a period for which the battery has been in use, and calculating, by the terminal, the threshold based on the duration of the period for which the battery has been in use.

BRIEF DESCRIPTION OF THE DRAWINGS

FIG. 3A depicts a schematic diagram of a server from the system of FIG. 1 in accordance with one aspect of the disclosure.

FIG. 3B depicts a schematic diagram of a server from the system of FIG. 1 in accordance with another aspect of the disclosure.

DETAILED DESCRIPTION

In one aspect, a server may be powered by a battery connected to a charging circuit. The charging circuit may charge the battery at the same time as the server draws power from it. Based on the voltage of the current supplied by the battery, the server may detect that the battery is no longer being charged by the charging circuit—possibly due to a power outage. When the battery stops being continuously re-charged, the server begins diminishing the charge stored in the battery until no charge remains and the server is left completely without power. Accordingly, when it is detected that the battery is no longer being re-charged, action may be taken to reduce the server's power consumption and prevent loss of data in the event that the battery runs out of charge completely.

Figure 1:
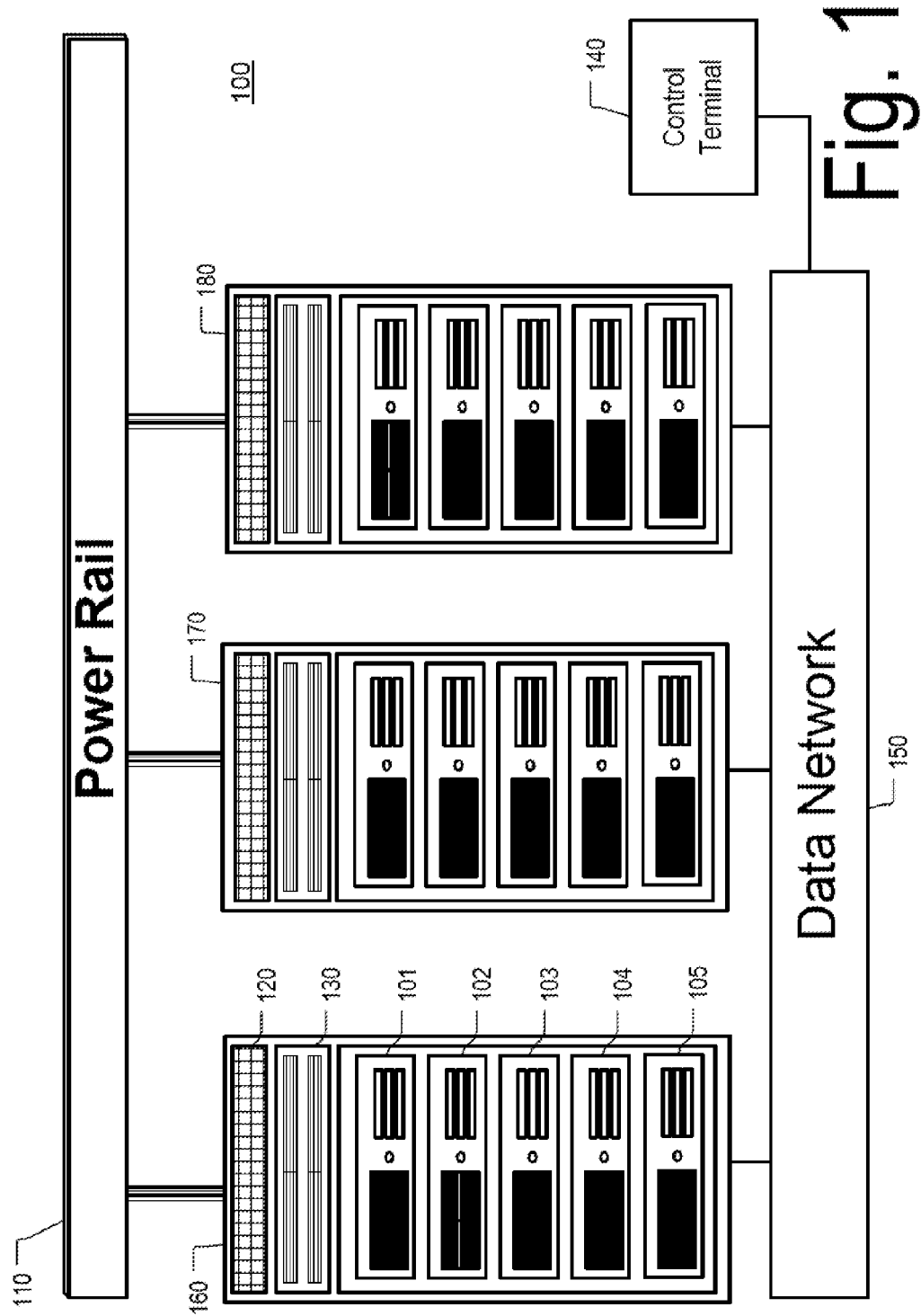
FIG. 1 depicts a schematic diagram of a system in accordance with aspects of the present disclosure.

FIG. 1 depicts a schematic diagram of the system 100 in accordance with aspects of the present disclosure. The system 100 is a data center comprising server racks 160, 170, and 180. Each of the server racks 160-180 comprises a plurality of servers. Each server may communicate with the other servers in the racks 160-180, or a terminal 140, via a network 150. Network 150 may be an Ethernet network, Infiniband network, or any other type of data network. The servers in system 100 and terminal 140 may be nodes in the network 150.

Server rack 160 may include servers 101-105. Each of the servers 101-105 may include one or more processors, memory, permanent storage, network adapter, display and any other hardware typically found in computers. Although not shown in FIG. 1, the server rack 160 may also include a switch, power distribution board, cooling system and other sub-systems.

Charging circuit 120 may be a battery charger used for charging the battery 130. The charging circuit 120 may be a trickle charger, pulse charger, or any other type of charger. The charging circuit 120 may receive power from an external power source. The external power source may be any component that is used in the generation and/or delivery of power to a server rack from outside the server rack. The external power source may thus be a generator, either located on the premises of the data center or run by a local utility company, a power grid, a distribution station, a transformer, or any other similar component. In the example of FIG. 1, the external power source may be any source is a power rail 110. In this example, the power rail 110 provides a 50V DC current. In some aspects, the use of a DC power supply is advantageous because it prevents the formation of reactive power. Nevertheless, in other examples, the charging circuit 120 may use any other type of power source (e.g., alternating current) having any voltage or current flow rate (e.g., 220V).

Battery 130 may be an alkaline battery, lead-acid battery, or any other type of battery. For example, the battery 130 may be a lead-acid battery including 24 cells, each cell having 2.1V output voltage for a total of 50.4V combined voltage. Although battery 130 is depicted as being shared by the servers 101-105, in some aspects, the battery 130 may be used by the server 101 alone. In some instances, the battery 130 may be part of a uninterruptable power supply (UPS) device 160 or another type of battery backup system. (See e.g., FIGS. 3A and 3B).

Terminal 140 may be a control terminal for managing the system 100. The terminal 140 may perform at least one of load balancing, power management, climate control, and battery management functions. The terminal 140 may be a desktop computer, laptop, smart phone, server, a computer cloud, a distributed computer system, or any other processor-based device or system. As such, the terminal 140 may comprise a processor, memory, a display device as well as other hardware that is typically found in processor-based computing devices. In one aspect, the terminal 140 may comprise multiple processors and multiple memory modules, either integrated into the same machine or interspersed among multiple devices that are part of a computer cloud or another type of distributed system.

In one aspect, the terminal 140 may perform load balancing functions. For example, the terminal 140 may be responsible for routing service requests that arrive at the system 100 (e.g., Internet search requests, multimedia requests) to different servers for completion. In another aspect, the terminal 140 may perform power management functions. The terminal 140 may shut down or bring online servers in order to minimize the power consumption of the system 100. For example, the terminal 140 may keep just enough servers online as are necessary to meet service demands. In that regard, the terminal 140 may be used to reduce the power consumption of the system 100.

Furthermore, in yet another aspect, the terminal 140 may manage different cooling systems. For example, the terminal 140 may monitor the temperature inside the room housing the server racks 160-180, as well as the temperature inside the individual server racks. Based on these temperatures, the terminal 140 may adjust the operation of air conditioners and server rack cooling modules. Moreover, the terminal 140 may manage the power backup sub-systems of the system 100 (e.g., battery 130, charging circuit 120). For example, the terminal may monitor various characteristics of the operation of battery 130, such as voltage of output current, temperature, and so forth. In the event of a power outage, the terminal 140 may conserve the charge in the battery 130 by causing one or more servers to enter into a reduced power consumption state or shut down completely. Furthermore, the terminal 140 may alter the scheduling of tasks to the servers in the system 100, or adjust the operation of cooling sub-systems in order to save energy.

Figure 2:
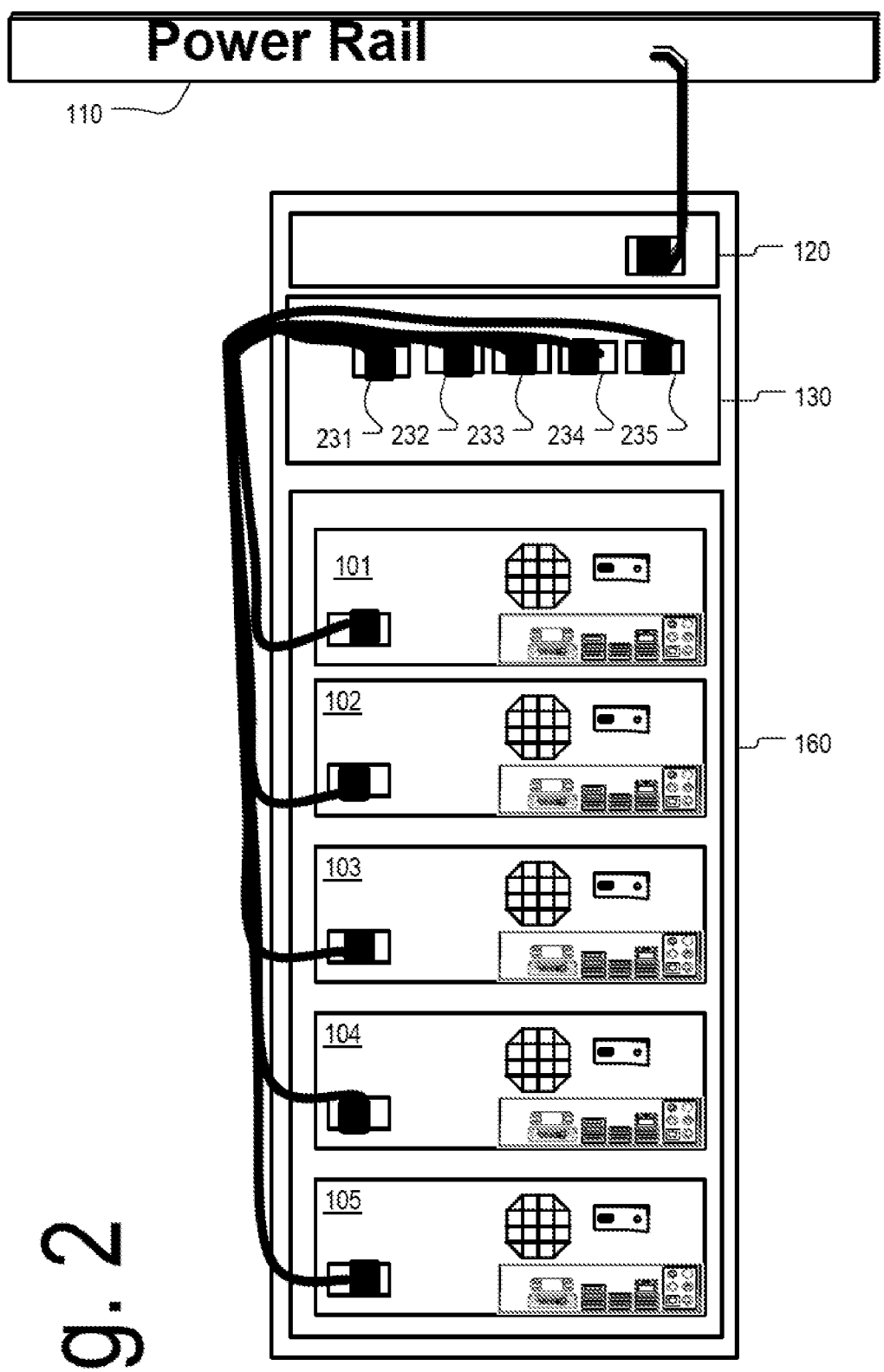
FIG. 2 depicts a schematic diagram of a server rack that is part of the system of FIG. 1.

FIG. 2 depicts schematic diagram showing the connectivity of the servers 101-105 to battery 130. As FIG. 2 illustrates, the battery 130 is connected to the servers 101-105 via power sockets 231-235. As discussed above, the sockets may provide 50V DC current. In other examples, however, they may provide current that has any voltage or power.

FIG. 3A depicts a schematic diagram illustrating aspects of the operation of the server 101. As FIG. 3 illustrates, power from the power rail 110 flows into the charging circuit 120 which uses it to charge the battery 130. The charging circuit 120 continually recharges battery 130 while the battery 130 provides server 101 with power via signal 380. The voltage of signal 380 is 50.4V when the battery 130 is fully charged. However, the voltage output by the battery 130 may decrease as the charge stored in it diminishes.

Server 101 may include a network interface 310, a processor 320, a memory 330, a converter module 360, sensors 370, and other components typically present in general purpose computers or servers in data centers. Memory 330 of server 101 stores information accessible by processor 320, including instructions 340 that may be executed by the processor 320. Memory 330 also includes data 350 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 320 may be any well-known processor, such as commercially available processors. Alternatively, the processor may be a dedicated controller such as an ASIC. The network interface 310 may be an Ethernet adapter, 802.11 adapter, Universal Serial Bus (USB) interface, a Bluetooth interface, or any other hardware and/or software for transmitting information to server 140 via network 150.

Data 340 may be retrieved, stored or modified by processor 320 in accordance with the instructions 350. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Discharge data 342 may include information related to the operation of different types of batteries. For example, discharge data 342 may include tables relating battery output voltage to the state of charge of the battery (e.g., amount of charge stored in the battery). Battery data 344 may include information that is specific to the battery 130. For example, it may indicate type of the half-reaction used by the battery to store energy (e.g., lead-acid, NiCd), number of cells in the battery 130, output voltage of the battery 130, output voltage per cell, duration of period for which the battery has been in use, total charge of the battery (e.g., 500 Ah), amount of current drawn from the battery 130 by server 101, amount of current drawn from the battery 130 by all servers connected to the battery 130. Discharge data 342 and battery data 344 may be used to determine the amount of charge left in the battery 130 based on the voltage of the signal 380.

Thresholds 346 may include one or more threshold values. The threshold values may correspond to voltage, current flow rate, or any other characteristic of: (i) current output by the battery 130 (e.g., signal 380), or (ii) current generated by converter module 360 or another component of server 101 based on the signal 380. Thresholds 346 may either be calculated by application 346 or manually entered as user input. In one aspect, the thresholds 346 may include a first threshold $T_1$ corresponding to the voltage output by battery 130 when it is at eighty percent (80%) capacity and a second threshold $T_2$ corresponding to the voltage output by the battery 130 when it is at forty percent (40%) capacity. For example, the battery 130 may output 49.9V when it is charged at 80% capacity while outputting 49.5V when charged at 40%. Accordingly, in this example, the first threshold $T_1$ may equal 49.9V with 49.5 being the value of the second threshold $T_2$. Although in this example, the thresholds $T_1$ and $T_2$ are voltage thresholds, in other examples they may relate to another signal characteristic, such as current flow rate, frequency, polarity, and others.

The instructions 350 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

Application 352 includes processor-executable instructions for monitoring one or more characteristics of the signal 380. In one example, the application 342 monitors the voltage of the signal 380 and compares it against a threshold such as the threshold $T_1$ discussed above. When the signal 380 crosses the threshold, the application 352 may cause the server 101 to change states. Although in this example application 142 is executed on the server 101, in other examples application 142 may be executed on the terminal 140. Furthermore, although discharge data 352 and battery data 354 are depicted as stored in the memory 330, in other examples, they also may be stored in a memory of the terminal 140.

Converter module 360 includes circuitry for converting signal 380 to one or more lower voltage signals that are fed to individual components of the server 101. For example, converter module 360 may output 3.3V to the processor 320 while outputting +12V to cooling fans in the server 101. Converter module 360 may be part of a power supply unit or it may be mounted directly on the server's motherboard.

Sensors 370 may be one or more sensors for measuring voltage or another current characteristic. The sensors 370 may measure a characteristic of at least one of: (i) the signal 380 that is received as input at the converter module 360, and (ii) a characteristics of a signal that is output by the converter module 360 to one of the server 101's components. Sensors 370 may be part of the converter module 360, or they may be mounted on the motherboard of server 101. Furthermore, the sensors 370 may be sensors integrated into the processor 320, the memory 330, or another component.

In this example, the battery 130 and the charger 120 are integrated together into an uninterruptable power supply (UPS) device 390, but in other examples they may be separate components. Although, in this example, the battery 130 and the external power supply 110 are connected in series to the server 101, that is the server 101 draws power from battery 130 while the charging circuit 120 is re-charging the battery at the same time, other arrangements are possible where the battery 130 is bypassed and power is delivered to the server 101 directly from the external power source 110. In such arrangements, the battery may be used by server 101 only when the external power source 110 fails or otherwise goes offline. One such arrangement is depicted in FIG. 3B where the power source 110 and the battery 130 are connected to the distribution module 360 of the server 101 via a switching circuit 395. The switching circuit 395 may include circuitry for detecting when the external power source 110 is out of service (e.g., due to a failure or some other reason) and connecting the server 101 to the battery in response, in order to provide uninterrupted power to the server 101. For example, when the external power source 110 is available, the battery 130 may be disconnected from the server 101. However, if the external power source 110 goes offline (e.g., becomes damaged or otherwise unavailable), the switching circuit 110 may connect the battery 130 to the server 101 thereby enabling the server 101 to start drawing power from the battery 130.

As illustrated, in the example of FIG. 3B, the switching circuit 395, the battery 130, and the charging circuit 120 are integrated into the UPS device 390. In other examples, however, they may be separate components. It should further be noted that in this example, the server 101 lacks a data connection to the UPS 390. Rather, as will be discussed further below, the server may monitor signal 380 to determine at least one of whether it is running on battery power and/or how much power is left in the battery. In that regard, the server 101 may be connected to the UPS 390 via only one cable (e.g., a power cable).

Figure 4:
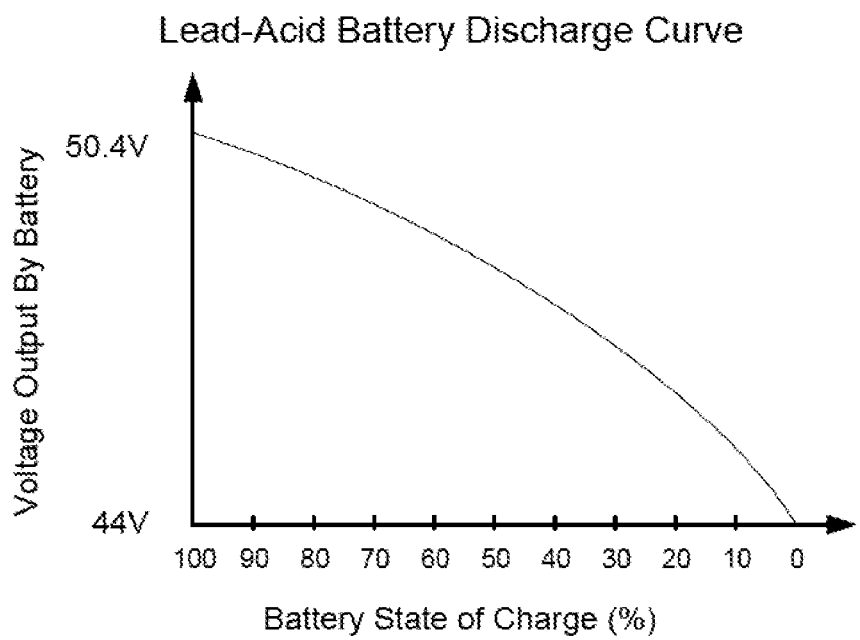
FIG. 4 depicts a plot of the discharge curve of a lead-acid battery.

FIG. 4 depicts a diagram of a discharge curve for a lead acid battery. The diagram relates the voltage output by the battery 130 to the amount of charge left in the battery 130. For example, when the battery 130 is fully charged, it may output 50.4V. But as the charge of the battery 130 is consumed, the output voltage drops to 44V by the time the battery charge is fully depleted. In that regard, FIG. 4 illustrates that the voltage of the signal 380 may be used by the server 101 to gauge the state of charge of the battery 130.

Figure 5:
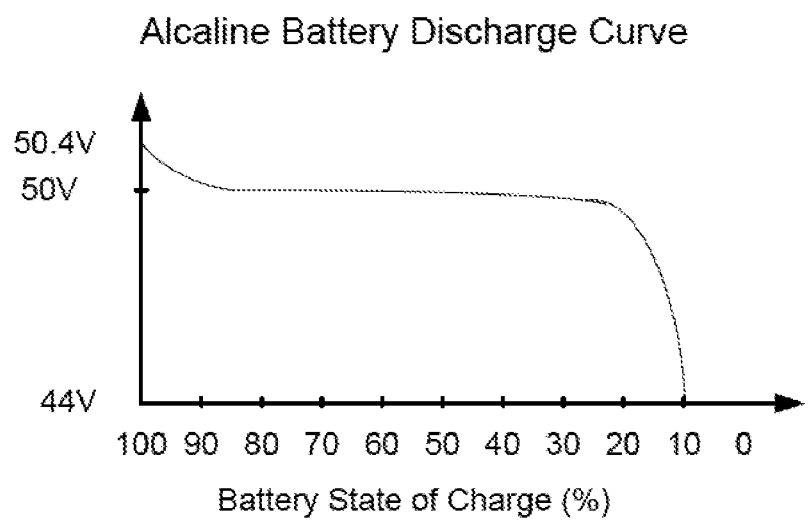
FIG. 5 depicts a plot of the discharge curve of an alkaline battery.

FIG. 5 depicts a diagram of a discharge curve for an alkaline battery. The alkaline battery uses a different half-reaction to store energy than the lead-acid battery. The alkaline battery, as illustrated, has a much flatter discharge curve. Unlike the lead-acid battery, it maintains a steady voltage throughout its operation with a sharp decline when the battery is just about to expire. For example, when a lead-acid battery is used a 0.5V drop in the output voltage may mean that the lead-acid battery is at 80% capacity, whereas the same voltage drop in an alkaline battery may mean that the alkaline battery is almost consumed and about the die.

Depending on the type of battery used, the server 101 may transition to different states in response to the same voltage drop. For example, if the battery 130 is a lead-acid battery, a 0.5V drop may cause the server 101 to reduce its power consumption, but continue to operate. However, if the battery is alkaline, a 0.5V drop may indicate that the battery has almost no charge left. Accordingly, the server 101 may need to immediately start saving data in preparation for an impending shutdown. The discharge data 342, alone or in conjunction with the battery data 344, may be used by the server 101 to determine the correspondence between the voltage of the signal 380 and the amount of charge left in the battery 130. In that regard, the discharge data 342 and/or the battery data 344 may be used, by server 101 or terminal 140, in selecting the state in which server 101 is to transition when a voltage drop takes place.

Figure 6:
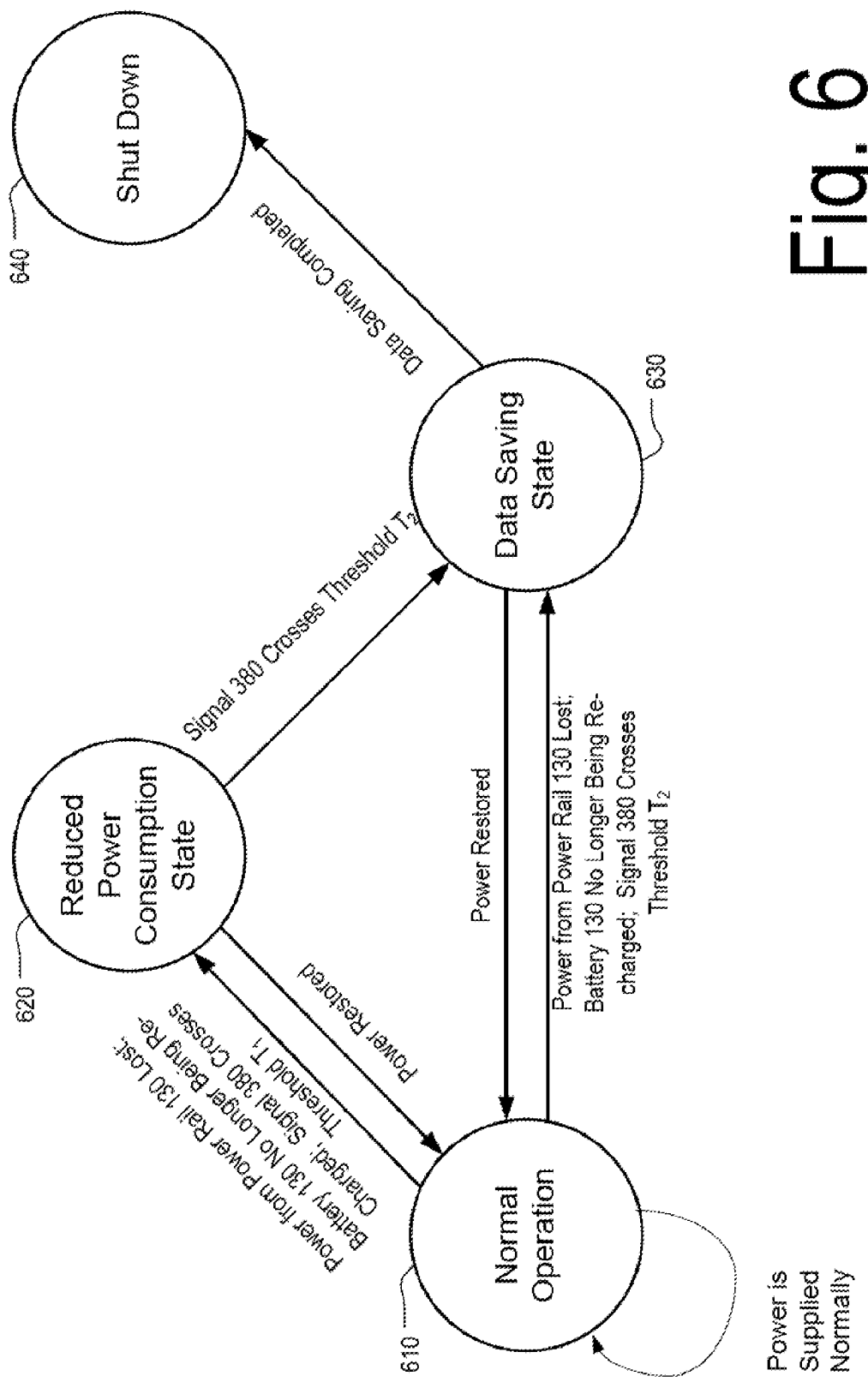
FIG. 6 depicts a state chart showing state transitions for the server of FIG. 3.

FIG. 6 depicts a state diagram of exemplary states undergone by the server 101 during its operation in accordance with aspects of the present disclosure. The state 610 is a state of normal operation. For as long as the power rail 110 supplies power to the charging circuit 120, and the charging circuit 120 continues to re-charge the battery 130 as the server 101 draws power from it, the server 101 remains in the state 610.

While the server 101 is in the state 610, it may monitor a characteristic of the signal 380. The monitored characteristic may be voltage or another signal characteristic. For example, when the voltage of the signal 380 falls below a first threshold $T_1$ (e.g., 49.9V), the server 101 may transition to the state 620. Alternatively, when the signal 380 falls below a second threshold $T_2$ (e.g., 49.5V), the server 101 may transition to the state 630.

While in the state 620, the server 101 may take measures to reduce its power consumption so as to prolong the charge of the battery 130. For example, the server may turn off peripheral devices or other components, refrain from executing certain types of jobs (e.g., services, processes), scale down the voltage multiplier of the processor 120, and so forth. The server 101 may remain in the state 620 until either the voltage of the signal 380 exceeds the first threshold $T_1$ or falls below the second threshold $T_2$. For example, if the signal 380 exceeds the first threshold $T_1$, the server may return back to the state 610. Alternatively, if the voltage of the signal 380 continues to decrease and it falls below the second threshold $T_2$, the server 101 may transition to the state 630.

While in the state 630, the server 101 may be preparing for a graceful shutdown. In doing so, the server may write all data in volatile memory to permanent storage and stop to accept permanent storage write requests. Furthermore, the server may shut down, and enter a state 640, before power from the battery 130 is lost completely. When in the state 640, the server 101 is offline and not running.

Figure 7:
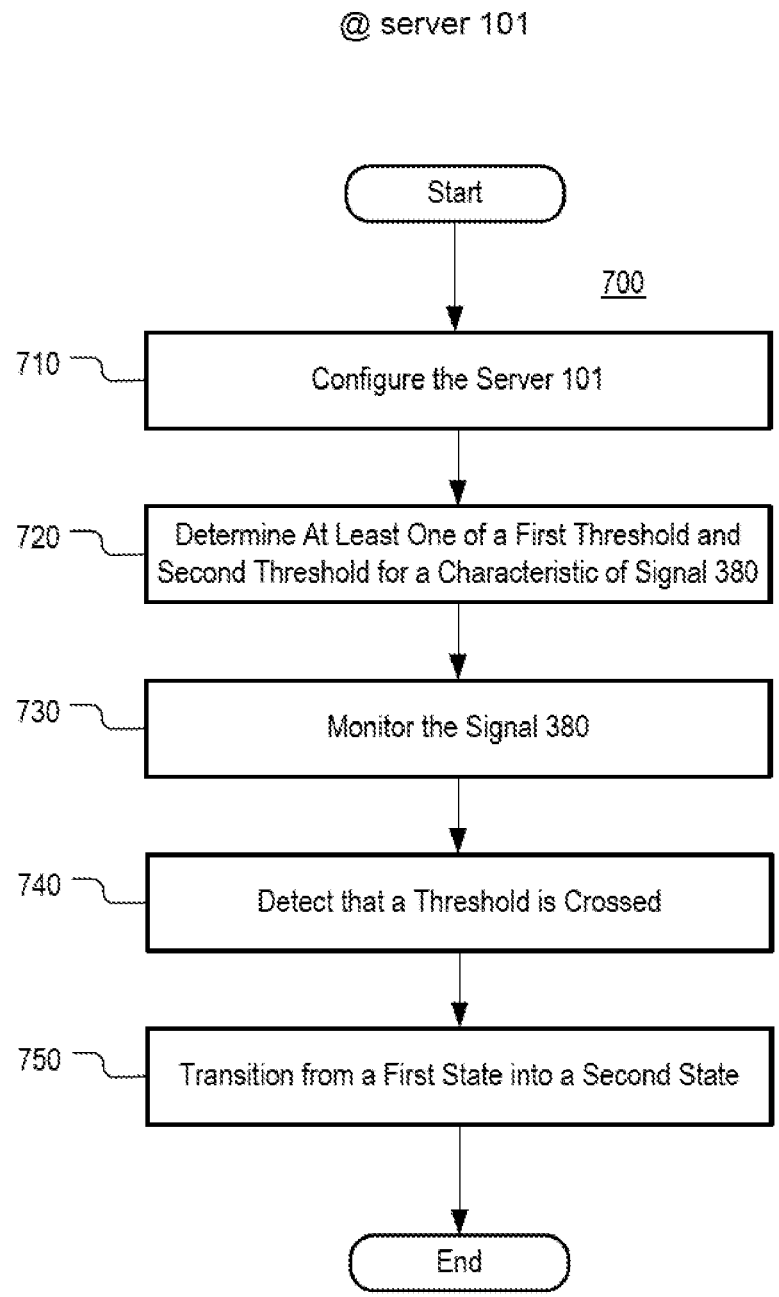
FIG. 7 depicts a flowchart of an exemplary process in accordance with aspects of the present disclosure.

FIG. 7 depicts a flowchart of an exemplary process 700 in accordance with one aspect of the disclosure. At task 710, the server 101 is configured to store in memory at least one of the battery data 344 and discharge data 342. At task 720, the value of a threshold T is determined. The threshold T value may either be obtained from user input or calculated dynamically based on the discharge data 342, battery data 344, or both.

When the threshold T is calculated dynamically, the server 101 may use a rule stored in the memory 330 to determine the value of the threshold T. For example, the rule may specify that the threshold T must equal the voltage output by the battery 130 when it is charged at 97% of its capacity. To determine the output voltage corresponding to the given state of charge, the server 101 may use any item of information that is part of the discharge data 342 and battery data 344. In one aspect, the corresponding output voltage may be found based on state of charge tables that are part of battery data 342. In another aspect, any item of information found in battery data 344, such as age of the battery or current drawn from the battery, may also be used in determining corresponding output voltage. Once the corresponding voltage is determined, it becomes the value of the threshold T.

At task 730, the server 101 begins monitoring at least one of (i) the signal 380 received from the battery 130 or (ii) a signal generated by the converter module 360 based on the signal 380. At task 740, the server 101 detects that the voltage of the monitored signal has fallen below the threshold T. At task 750, in response to detecting that the threshold T is crossed, the server 101 may transition from a first state to a second state. By way of example, the server 101 may enter either one of the state 620 or 630.

In one aspect, the crossing of the threshold T may indicate to the server 101 (or terminal 140) that the battery charging circuit 120 is no longer charging the battery 130. As discussed with respect to FIGS. 4 and 5, when the battery 130 is discharging, the voltage output by the battery 130 decreases slightly almost immediately. In another aspect, the crossing of the threshold T may indicate to the server 101 (or terminal 14) that the server 101 is running on battery power. In that regard, by monitoring the voltage, the server 101 may dispense with the need of a data connection between the server 101 and the UPS 390 that is used by the UPS 390 to transmit signals to the server 101 that alert the server that it is running on battery power and the battery is soon to expire.

In general, the closer the threshold T is to the voltage output by the battery 130 when it is fully charged, the sooner it will be detected that the battery charging circuit 120 has stopped charging the battery 130 and/or that the server 101 is running on battery power alone. Similarly, setting the threshold T to equal the voltage of battery 170 when it is charged at 97% capacity also ensures a prompt detection that the battery charging circuit 120 has seized re-charging the battery 130.

Moreover, in some aspects, the server 101 may choose the second state based on a number of criteria. The second state may be chosen based on the charge left in the battery 130. For example, if the battery 130 is charged at 10% of its capacity, the server 101 may transition to the state 630. Alternatively, if the battery is charged at 80% of its capacity, the server 101 may transition to the state 620. As discussed above, the amount of charge left in the battery 130 may be determined based on the voltage of the signal 380 or a signal generated based on the signal 380. The state which server 101 transitions into may thus be chosen based on any item of information that is part of discharge data 342 and battery data 344.

Figure 8:
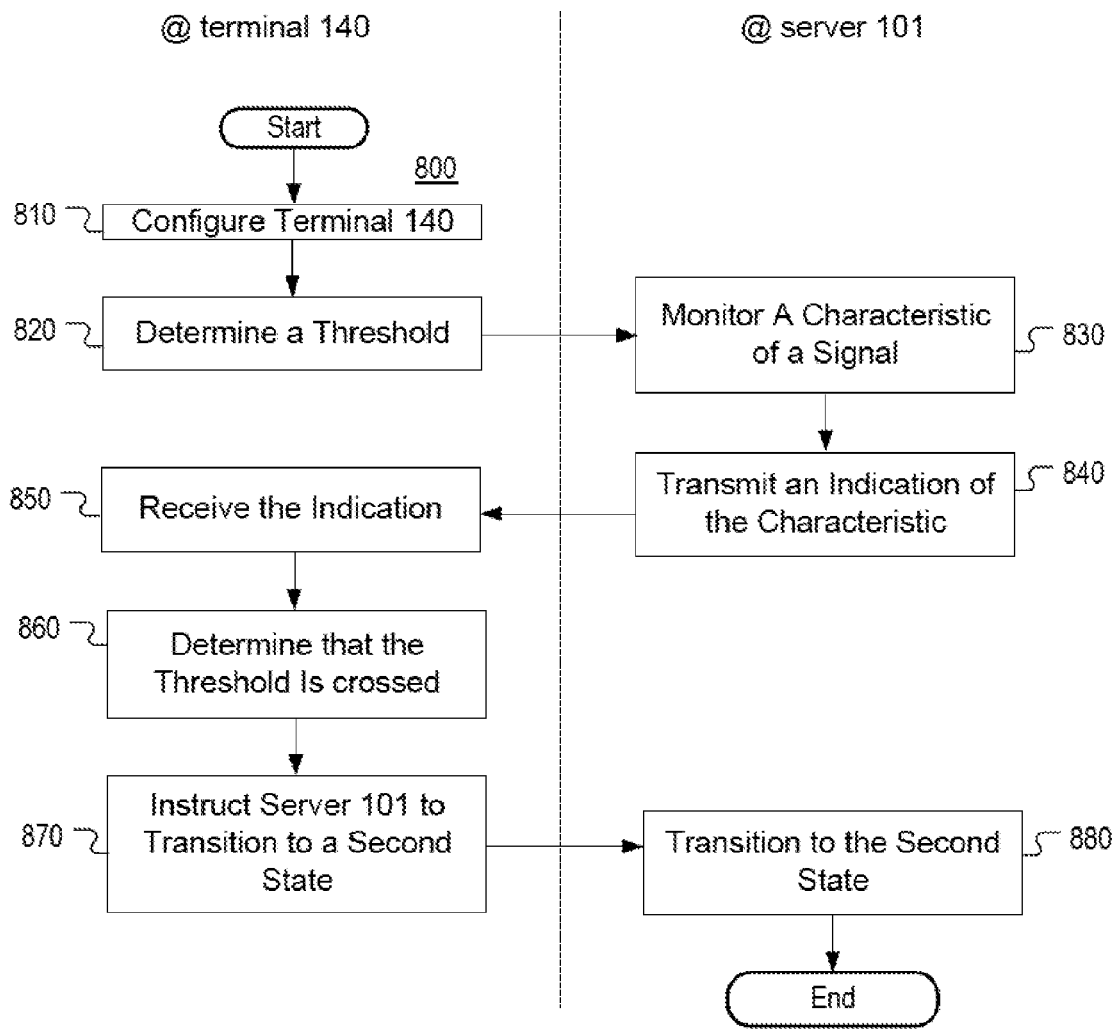
FIG. 8 depicts a flowchart of another exemplary process in accordance with aspects of the present disclosure.

FIG. 8 depicts a flowchart of an exemplary process 800 in accordance with another aspect of the disclosure. The process 800, in one aspect, is different from the process 700 because terminal 140, rather than server 101, chooses the state entered by the server 101 when the charge in the battery 130 starts diminishing.

At task 810, terminal 140 is configured to store in memory at least one of the battery data 344 and discharge data 342. At task 820, the value of a threshold T is determined. The threshold T may be obtained from user input or calculated dynamically based on discharge data 342, battery data 344, or both. Terminal 140 may calculate the value of the threshold T in the same manner as discussed with respect to task 820.

At task 830, server 101 begins monitoring at least one of (i) the signal 380 received from the battery 130 or (ii) a signal generated by the converter module 360 based on the signal 380. At task 840, the server 101 transmits to terminal 140, via network 150, an indication of a characteristic of the signal that is being monitored. In this example, the server 101 transmits an indication of the voltage of the signal 380.

At task 850, terminal 140 receives the transmitted indication. At task 860, terminal 140 determines that the voltage of the signal 380 has crossed the threshold T. At task 870, in response to determining that the threshold has been crossed, terminal 140 generates and transmit a message to server 101 instructing it to transition from a first state to a second state. By way of example, the terminal 140 may instruct the server 101 to enter either one of the state 620 and state 630. At task 880, server 101 receives the message and transitions to the second state as instructed.

In some aspects, the second state may be chosen by the terminal 140 based on a number of criteria. For example, the second state may be chosen based on the charge left in the battery 130. Similarly, the second state may be chosen based on other considerations that indicate how soon the battery 130 is likely to expire. Such other considerations may include the amount of current which server 101 draws from the battery 130, the number of other servers that draw power from the battery 130, the duration of the time period for which server 101 has been connected to the battery 130, and so forth.

Furthermore, the second state may be chosen by the terminal 140 based on the load placed on the system 100. For example, if the system 100 receives many service requests (e.g., Internet search queries, media content requests), the terminal 140 may instruct server 101 to enter the state 620 and remain online. Conversely, if the load on the system 100 is low, the server 101 may opt to shut server 101 down (e.g., state 640).

Figure 9:
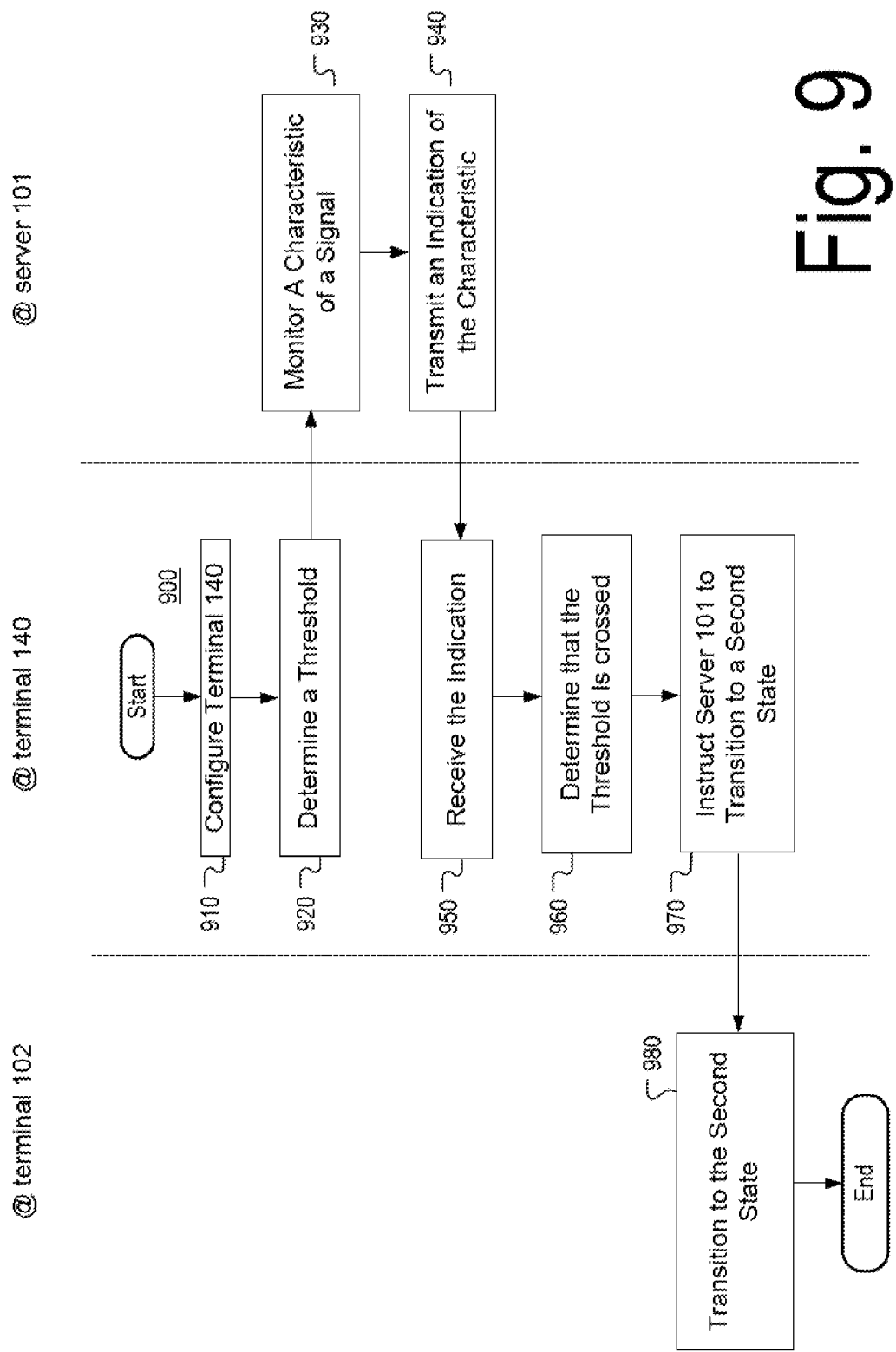
FIG. 9 depicts a flowchart of yet another exemplary process in accordance with aspects of the present disclosure.

FIG. 9 depicts a flowchart of an exemplary process 900 in accordance with yet another aspect of the disclosure. The process 900, in one aspect, is different from the processes 700 and 800 because the state of server 102, rather than server 101, is altered when server 101 begins diminishing the charge of the battery 130.

At task 910, terminal 140 is configured to store in memory at least one of the battery data 344 and discharge data 342. At task 920, the value of a threshold T is determined. The threshold value may either be obtained from user input or calculated dynamically based on discharge data 342, battery data 344, or both. Terminal 140 may calculate the value of the threshold in the same manner as discussed with respect to task 820.

At task 930, server 101 may begin monitoring at least one of (i) the signal 380 received from the battery 130 or (ii) a signal generated by the converter module 360 based on the signal 380. At task 940, the server 101 transmits to terminal 140, via network 150, an indication of a characteristic of the signal that is being monitored. In this example, the server 101 transmits an indication of the voltage of signal 380.

At task 950, the terminal 140 receives the transmitted indication. At task 960, terminal 140 determines that the voltage of the signal 380 has crossed the threshold T. At task 970, in response to determining that the threshold T has been crossed, terminal 140 generates and transmits a message to server 102 instructing it to transition from a first state to a second state. The second state may be chosen in the same manner as discussed with respect to the process 800. At task 980, server 102 receives the message and transitions to the second state as instructed.

Figure 10:
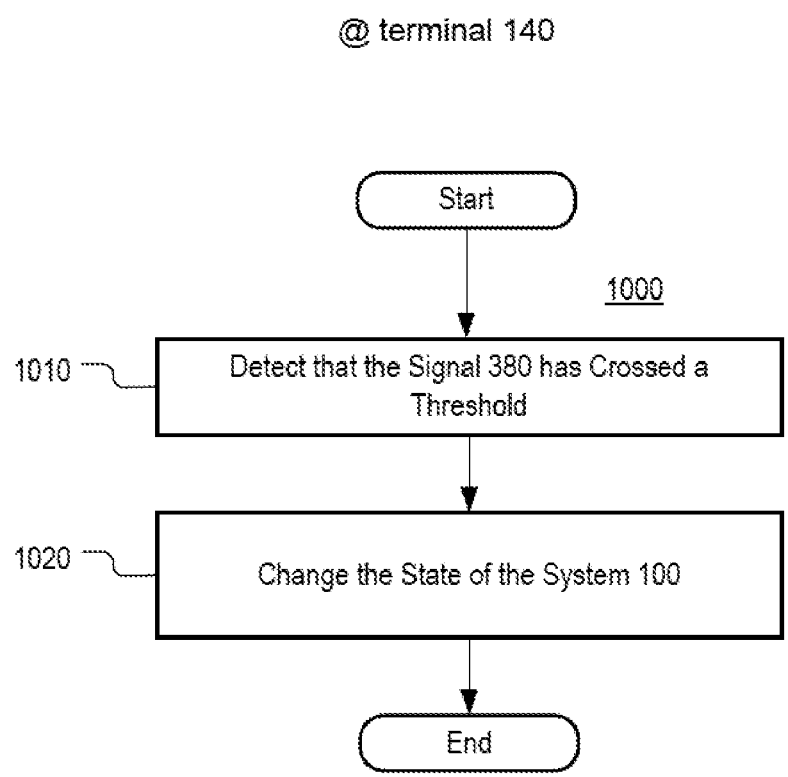
FIG. 10 depicts a flowchart of yet another exemplary process in accordance with aspects of the present disclosure.

FIG. 10 depicts a flow chart of exemplary process 1000 in accordance with yet another aspect of the disclosure. In this example, the terminal 140 detects that a signal that is monitored by the terminal 101 (e.g., signal 380) has crossed a threshold (task 1010). In response to detecting the threshold has been crossed, the terminal 140 changes the manner in which it controls the system 100 (task 1020). In one aspect, the terminal 140 may decrease the amount of incoming service requests that are scheduled to server 101. By doing so, the terminal 140 may effectively reduce the amount of work performed by the server 101 and cause the charge of the battery 130 to be diminished at a slower pace. In another aspect, the terminal 140 may increase the amount of incoming service requests that are scheduled to server 102. In that regard, by increasing the load on other portions of the system 100, the terminal may shift load away from the server 101.

FIGS. 7-10 are provided as an example. At least some of the tasks associated with FIGS. 7-10 may be performed in a different order than represented, performed concurrently or altogether omitted. Furthermore, some or all of the tasks discussed with respect to processes 800-1000 may be combined together into a single embodiment.

Although the state transitions that are discussed in the above examples are triggered by a signal voltage crossing a threshold, further variations are possible where state transitions are triggered by changes in another signal characteristic, such as current flow rate, frequency, polarity and so forth. Thus, although in the above example the signal 380 is a DC signal, further variations are possible where the signal 380 is an AC signal. As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A data center comprising:
a server;
an external power source coupled to the server;
a battery; and
a battery charger coupled to the battery and the external power source, the battery charger being configured to charge the battery;
wherein the server is configured to:
monitor a voltage output by the battery using one or more voltage sensors;
detect, based on the voltage, that the server is running on battery power; and
in response to detecting that the battery charger is no longer re-charging the battery while the server is drawing power from the battery, transition from a first state to a second state in which the server consumes a reduced amount of power while still continuing to operate.

2. The data center of claim 1, wherein the server is further configured to detect that the battery charger is no longer re-charging the battery while the server is drawing power from the battery.

3. The data center of claim 1, wherein the battery is part of an uninterruptable power supply (UPS) device and the server lacks a data connection to the UPS device.

4. The data center of claim 1, wherein the battery is used to power the server while being simultaneously charged by the power charger.

5. The data center of claim 1, wherein:
the server is part of a server rack in the data center; and
the battery and battery charger are part of a battery backup system used by the server rack.

6. The data center of claim 1, wherein the server is further configured to:
store in a memory, an indication of one or more of:
(i) half-reaction used by the battery to store power;
(ii) number of cells in the battery;
(iii) voltage output by the battery when the battery is fully charged; and
calculate a threshold based on the indication that is stored in the memory;
wherein the detection that the battery charger is no longer re-charging the battery while the server is drawing power from the battery is based on the voltage crossing the threshold.

7. The data center of claim 1, wherein the server is further configured to:
store in a memory an indication of a rate at which the server draws power from the battery; and
calculate a threshold based on the rate at which the server draws power from the battery;
wherein the detection that the battery charger is no longer re-charging the battery while the server is drawing power from the battery is based on the voltage crossing the threshold.

8. The data center of claim 1, wherein the server is further configured to:
store in a memory, an indication of duration of a period for which the battery has been in use; and
calculate a threshold based on the duration of the period for which the battery has been in use;
wherein the detection that the battery charger is no longer re-charging the battery while the server is drawing power from the battery is based on the voltage crossing the threshold.

9. A data center comprising:
a control terminal;
an external power source;
a battery charger coupled to the external power source;
a battery coupled to the battery charger, the battery charger re-charging the battery while the battery is supplying power to one or more servers in the data center;
a first server coupled to the battery, the first server being powered by a signal that is output by the battery, and the first server being configured to transmit an indication of a characteristic of the signal to the control terminal;
wherein the control terminal is configured to:
receive the indication of the characteristic that is transmitted by the first server; and detect, based on the characteristic crossing a threshold, that the battery charger is no longer re-charging the battery while the server is drawing power from the battery.

10. The data center of claim 9, wherein the characteristic is voltage.

11. The data center of claim 9, wherein the control terminal is further configured to transmit to the first server a message instructing the first server to transition from a first state into a second state;
wherein the message is transmitted by the control terminal in response to detecting that the battery charger is no longer re-charging the battery while the first server is drawing power from the battery.

12. The data center of claim 9, further comprising a second server, wherein the control terminal is further configured to transmit to the second server a message instructing the second server to transition from a first state to a second state;
wherein the message is transmitted by the control terminal in response to detecting that the battery charger is no longer re-charging the battery while the first server is drawing power from the battery.

13. The data center of claim 9, wherein the control terminal is configured to reduce a rate at which service requests received at the data center are routed to the first server;
wherein the rate is reduced by the control terminal in response to detecting that the battery charger is no longer re-charging the battery while the first server is drawing power from the battery.

14. The data center of claim 9, wherein the control terminal is further configured to:
store in a memory, an indication of one or more of:
(i) half-reaction used by the battery to store power;
(ii) number of cells in the battery;
(iii) voltage output by the battery when the battery is fully charged; and
calculate the threshold based on the indication that is stored in the memory.

15. The data center of claim 9, wherein the control terminal is further configured to:
store in a memory an indication of a rate at which the first server draws power from the battery; and
calculate the threshold based on the rate at which the first server draws power from the battery.

16. The data center of claim 9, wherein the control terminal is further configured to:
store in a memory, an indication of duration of a period for which the battery has been in use; and
calculate the threshold based on the duration of the period for which the battery has been in use.

17. A method for providing battery backup to servers in a data center, the method comprising:
connecting a battery charger to an external power source;
connecting the battery charger to a battery;
re-charging the battery by the battery charger while the server is drawing power from the battery;
monitoring voltage output by the battery by using one or more voltage sensors that are part of the server;
transmitting, from the server to a terminal, an indication of the voltage output by the battery;
when the voltage output by the battery crosses a predetermined threshold, receiving from the terminal a message instructing the server to transition from a first state to a second state.

18. The method of claim 17, wherein the terminal is in charge of monitoring power backup systems in the data center.

19. The method of claim 17, wherein:
the signal is a direct current (DC) signal;
the battery is located on the only electric path between the external power source and the server; and
the external power source is the only source of power used by the server.

20. The method of claim 17, wherein transitioning from the first state to the second state causes the server to reduce the amount of power needed by the server to operate.

21. The method of claim 17, further comprising:
storing in a memory of the terminal, an indication of one or more of:
(i) half-reaction used by the battery to store power;
(ii) number of cells in the battery;
(iii) voltage output by the battery when the battery is fully charged; and
calculating, by the terminal, the threshold based on the indication that is stored in the memory.

22. The method of claim 17, further comprising:
storing in a memory of the terminal, an indication of a rate at which the server draws power from the battery; and
calculating, by the terminal, the threshold based on the rate at which the server draws power from the battery.

23. The method of claim 17 further, comprising:
storing in a memory of the terminal, an indication of duration of a period for which the battery has been in use; and
calculating, by the terminal, the threshold based on the duration of the period for which the battery has been in use.

* * * * *